(12) United States Patent
Tse et al.

(10) Patent No.: US 8,736,906 B2
(45) Date of Patent: *May 27, 2014

(54) METHOD AND APPARATUS FOR PROCESSING PRINT JOB IN PRINTING PLATFORM FOR DETERMINING ROTATION

(75) Inventors: Francis Kapo Tse, Rochester, NY (US); Peter Charles Rapley, Portland, OR (US); David Russel Sponable, Keizer, OR (US); Jason Slack, Rochester, NY (US); David Rivshin, Rochester, NY (US); Lonnie A. LaFave, Sherwood, OR (US); Steve Beers, Macedon, NY (US); James Bruce Campbell, Beaverton, OR (US); Fritz Ebner, Pittsford, NY (US); Scott Charles Warner, Ontario, NY (US); Timothy M. Hunter, Webster, NY (US); Lee Roche, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 320 days.

This patent is subject to a terminal disclaimer.

(21) Appl. No.: 13/095,451

(22) Filed: Apr. 27, 2011

(65) Prior Publication Data

US 2012/0075677 A1   Mar. 29, 2012

Related U.S. Application Data

(60) Provisional application No. 61/387,720, filed on Sep. 29, 2010.

(51) Int. Cl.
*G06K 15/00* (2006.01)
*H04N 1/40* (2006.01)

(52) U.S. Cl.
USPC ............................................ 358/2.1; 358/1.18

(58) Field of Classification Search
USPC ........................................... 358/1.9, 2.1, 1.18
See application file for complete search history.

(56) References Cited

U.S. PATENT DOCUMENTS

| | | | |
|---|---|---|---|
| 6,268,927 B1 * | 7/2001 | Lo et al. | 358/1.15 |
| 7,889,385 B2 * | 2/2011 | Toda | 358/1.9 |
| 2003/0123072 A1 * | 7/2003 | Spronk | 358/1.9 |
| 2004/0036894 A1 * | 2/2004 | Murata | 358/1.5 |
| 2004/0114174 A1 | 6/2004 | Kathan et al. | |
| 2006/0215200 A1 | 9/2006 | Matsuro et al. | |
| 2007/0002085 A1 | 1/2007 | Sampath et al. | |
| 2009/0051947 A1 * | 2/2009 | Kuroshima | 358/1.9 |
| 2009/0279131 A1 | 11/2009 | Matsui et al. | |
| 2010/0188691 A1 * | 7/2010 | Tao | 358/1.15 |

* cited by examiner

Primary Examiner — Barbara Reinier
(74) *Attorney, Agent, or Firm* — Fay Sharpe LLP

(57) ABSTRACT

A method for processing a print job includes: a) analyzing printer description language (PDL) image data for a print job; b) determining a raster image processor (RIP) orientation for the print job based at least in part on the analysis of the PDL image data, the RIP orientation being selected from a landscape orientation and a portrait orientation; and c) processing the PDL image data for each page of the print job to form raster image data for each page in the RIP orientation and storing the raster image data in the RIP orientation. A printing platform associated with the method includes a parser module, a controller module, a storage device, and a RIP module.

20 Claims, 19 Drawing Sheets

| DOCUMENTS | C2C DATA (SEC) | | | | |
|---|---|---|---|---|---|
| | LASER | SIJ W/CBC | SIJ 1 W/SBC | SIJ 2 W/SBC | SIJ 3 W/SBC |
| DOC 1 | 56.9 | 80.5 | 100.8 | 94.2 | 81.6 |
| DOC 2 | 28.9 | 46.7 | 38.8 | 38.4 | 35.8 |
| DOC 3 | 34.3 | 27.8 | 44.5 | 43.7 | 35.4 |
| DOC 4 | | | 209.3 | 191.7 | 173.5 |
| DOC 5 | 54.3 | 227.2 | 135.4 | 126.1 | 113.1 |
| DOC 6 | 49 | 186.3 | 132.5 | 128.4 | 113.2 |
| DOC 7 | | | 137.1 | 182.0 | 163.4 |
| DOC 8 | 18.1 | 20.8 | 20.1 | 19.5 | 16.3 |
| DOC 9 | 67.7 | 594.5 | 339.5 | 332.2 | 314.5 |

FIG. 1

| LEF TARGET SUBSTRATE |||||||
|---|---|---|---|---|---|---|
| LANDSCAPE PRINT JOB (PCL) ||| AVERAGE RIP AND C2C DATA (SEC) ||||
| ||| LASER || SIJ ||
| DOCS | APP | PAGES | RIP LEF | C2C | RIP SEF | C2C |
| DOC 1 | PPT | 9 | 21.76 | 39.89 | 19.07 | 35.74 |
| DOC 2 | PPT | 4 | 30.43 | 42.32 | 19.11 | 32.97 |
| DOC 3 | PPT | 100 | 165.35 | 179.80 | 171.46 | 224.89 |
| DOC 4 | PPT | 13 | 115.56 | 130.94 | 111.74 | 122.00 |
| DOC 5 | PPT | 10 | 39.27 | 52.34 | 64.23 | 74.44 |
| DOC 6 | PPT | 20 | 141.5 | 157.34 | 148.50 | 160.70 |
| DOC 7 | PDF | 4 | 13.17 | 29.99 | 6.66 | 24.21 |
| DOC 8 | PPT | 6 | 18.51 | 35.22 | 10.45 | 24.66 |
| DOC 9 | PPT | 27 | 74.35 | 85.93 | 110.95 | 121.42 |

FIG. 6

| SEF TARGET SUBSTRATE |||||||
|---|---|---|---|---|---|---|
| LANDSCAPE PRINT JOB (PCL) ||| AVERAGE RIP AND C2C DATA (SEC) ||||
| ||| LASER || SIJ ||
| DOCS | APP | PAGES | RIP SEF | C2C | RIP LEF | C2C |
| DOC 1 | PPT | 9 | 27.02 | 51.92 | 22.02 | 33.76 |
| DOC 2 | PPT | 4 | 28.68 | 51.03 | 22.04 | 33.41 |
| DOC 3 | PPT | 100 | 171.86 | 197.48 | 210.15 | 220.72 |
| DOC 4 | PPT | 13 | 129.97 | 145.54 | 152.41 | 162.42 |
| DOC 5 | PPT | 10 | 111.03 | 126.93 | 133.03 | 143.94 |
| DOC 6 | PPT | 20 | 165.77 | 204.00 | 193.41 | 205.64 |
| DOC 7 | PDF | 4 | 13.88 | 31.69 | 6.42 | 19.44 |
| DOC 8 | PPT | 6 | 19.79 | 37.75 | 13.31 | 23.75 |
| DOC 9 | PPT | 27 | 298.97 | 312.45 | 337.57 | 347.67 |

FIG. 7

| LEF TARGET SUBSTRATE | | | | | | |
|---|---|---|---|---|---|---|
| LANDSCAPE PRINT JOB (PS) | | | AVERAGE RIP AND C2C DATA (SEC) | | | |
| | | | LASER | | SIJ | |
| DOCS | APP | PAGES | RIP LEF | C2C | RIP SEF | C2C |
| DOC 1 | PPT | 9 | 18.31 | 47.49 | 19.01 | 35.74 |
| DOC 2 | PPT | 4 | 28.19 | 47.48 | 25.53 | 36.30 |
| DOC 3 | PPT | 100 | 76.87 | 148.37 | 151.17 | 224.72 |
| DOC 4 | PPT | 13 | 54.50 | 68.24 | 78.60 | 89.85 |
| DOC 5 | PPT | 10 | 45.06 | 58.84 | 38.37 | 49.73 |
| DOC 6 | PPT | 20 | 77.68 | 90.77 | 95.19 | 106.16 |
| DOC 7 | PDF | 4 | 9.70 | 31.51 | 5.12 | 19.64 |
| DOC 8 | PPT | 6 | 35.62 | 47.79 | 19.97 | 34.60 |
| DOC 9 | PPT | 27 | 68.35 | 81.80 | 75.71 | 89.08 |

FIG. 8

| SEF TARGET SUBSTRATE | | | | | | |
|---|---|---|---|---|---|---|
| LANDSCAPE PRINT JOB (PS) | | | AVERAGE RIP AND C2C DATA (SEC) | | | |
| | | | LASER | | SIJ | |
| DOCS | APP | PAGES | RIP SEF | C2C | RIP LEF | C2C |
| DOC 1 | PPT | 9 | 34.60 | 57.46 | 25.63 | 39.25 |
| DOC 2 | PPT | 4 | 35.18 | 48.60 | 28.15 | 37.98 |
| DOC 3 | PPT | 100 | 138.20 | 196.39 | 189.47 | 202.01 |
| DOC 4 | PPT | 13 | 128.29 | 150.54 | 116.67 | 127.38 |
| DOC 5 | PPT | 10 | 164.84 | 178.51 | 109.98 | 119.83 |
| DOC 6 | PPT | 20 | 293.41 | 316.89 | 168.81 | 179.14 |
| DOC 7 | PDF | 4 | 8.11 | 23.50 | 4.90 | 16.41 |
| DOC 8 | PPT | 6 | 37.38 | 52.06 | 20.49 | 31.85 |
| DOC 9 | PPT | 27 | 514.42 | 527.46 | 324.70 | 335.22 |

FIG. 9

METHOD AND APPARATUS FOR PROCESSING PRINT JOB IN PRINTING PLATFORM FOR DETERMINING ROTATION

CROSS REFERENCE TO RELATED PATENTS AND APPLICATIONS

This patent application claims priority to and any benefit associated with U.S. provisional patent application, Ser. No. 61/387,720, filed Sep. 29, 2010, the contents of which are fully incorporated herein by reference.

BACKGROUND

The present exemplary embodiment relates to processing a print job by analyzing printer description language (PDL) image data, determining a raster image process (RIP) orientation, and processing the PDL image data to form raster image data in the RIP orientation. It finds particular application in conjunction with a solid ink jet (SIJ)-based printing platform with an integrated marking engine (IME). However, it is to be appreciated that the exemplary embodiments described herein are also amenable to various other types of printing platforms and other types of print engines, such as a laser-based printing platform with an image output terminal (IOT).

In printing platforms, the page orientation for RIP has traditionally been based on the page orientation for image data preferred by the print engine. For example, the controller for a laser scan-based IOT is set to RIP in the long edge (i.e., landscape) orientation for a letter size print job because the corresponding laser printer is set up to feed letter size target substrate pages for the print job in a long edge (i.e., landscape) orientation and a laser scan in the IOT runs in a cross-process direction relating to the long edge of the target substrate pages. Conversely, the controller for a SIJ-based IME is set to RIP in the short edge (i.e., portrait) orientation for the same letter size print job because, even though the corresponding SIJ printer is set up to feed letter size target substrate pages for the print job in a long edge (i.e., landscape) orientation, inkjets in the IME are arranged in a process direction. Thus, the IME prefers image data to be arranged in short edge (i.e., portrait) orientation.

Depending on the content of the document to be printed, RIP time can have a significant impact on total print time (i.e., time from activation of a print command or print control that starts the print job to delivery of the finished print job to an output tray on the printing platform). The total print time may be referred to as click-to-clunk (C2C) time. The difference in C2C time between RIPing a print job in one orientation versus the transverse orientation can be significant, particularly for documents having certain types of content. For example, this is a problem for PowerPoint (PPT) files with complex contents (e.g., graphics objects, image objects, or any combination thereof) if the files are designated for printing from the application program in an orientation transverse to the orientation for RIP in the printing platform. PostScript (PS) or printer control language (PCL) files generated from printing these PPT files using the PowerPoint application program may contain a lot of single pixel strips of graphics or image objects. For example, if landscape orientation is selected in the PowerPoint application program for printing the PPT file and the printing platform RIPs in the short edge (i.e., portrait) orientation, RIP time may be increased by a factor of three or four times over what the RIP time would be if the orientation selected for printing and the orientation for RIP matched.

Certain printer customers may have escalated issues when it comes to replacing an existing laser-based printing platform with an SIJ-based printing platform if print times are significantly slower. The complaint may be that first set out times (FSOTs) for at least some of the customer's documents are excessive for the SIJ-based printing platform in relation to those previously experienced for the same documents when printing with the laser-based printing platform. A task force at Xerox reviewed concerns raised by certain customers in order to understand factors contributing to this problem and suggest potential solutions. The goal of the task force was to find solutions that would improve performance across various types of printing platforms beyond a benchmark performance achieved by a laser-based printing platform with a single board controller (SBC) configuration.

With reference to FIG. 1, the Xerox task force analyzed several existing products and observed speed improvements in C2C and RIP times when comparing SIJ-based printing platforms with SBC configurations to comparable SIJ-based printing platforms with multi-board controller configurations (e.g., common board controller (CBC) configurations). Performance improvements were also observed in SIJ-based printing platforms when faster processors, comparable to processors used in laser-based printing platforms, were implemented in the controllers for the corresponding SIJ-based printing platform. The chart in FIG. 1 shows exemplary C2C times observed by the Xerox task force. Please note that the data is shown for illustration of the general issue. "Noise" and other factors may be causing some variance in some specific data points represented in the chart.

In particular, the Xerox task force observed that certain customers with both laser-based printing platforms and SIJ-based printing platforms noticed large discrepancies in C2C times between the different platforms, especially in printing complex PowerPoint documents in a landscape orientation. While customers can understand performance reduction due to known differences in laser-based and SIJ-based printing and known design tradeoffs between the different printing platforms, the significantly slower printing performance for at least certain documents creates uncertainty about the achievable print performance in SIJ-based printing platforms. Therefore, improved processing with reduction in RIP time and C2C time to improve performance in certain types of printing platforms is desired, particularly for SIJ-based printing platforms. Improved processing with reduction in RIP time and C2C time to increase printing performance for certain types of documents is also desired, particularly for PowerPoint documents and other types of documents with complex content (e.g., graphics objects, image objects, or any combination thereof).

INCORPORATION BY REFERENCE

The following documents are fully incorporated herein by reference: 1) U.S. provisional patent application, Ser. No. 61/387,738 to Tse et al., filed Sep. 29, 2010, Method and Apparatus for Processing Print Job in Printing Platform, and 2) U.S. Pat. App. Publication No. 2012/0075649 to Tse et al. (Ser. No. 13/095,314), filed Apr. 27, 2011, Method and Apparatus for Processing Print Job in Printing Platform, which claims priority to Ser. No, 61/387,738.

BRIEF DESCRIPTION

In one aspect, a method for processing a print job in a printing platform is provided. In one embodiment, the method includes: a) analyzing printer description language (PDL) image data for a print job at a parser module; b) determining a raster image processor (RIP) orientation for the print job at a controller module based at least in part on the analysis of the PDL image data, the RIP orientation being selected from a landscape orientation and a portrait orientation; and c) processing the PDL image data for each page of the print job at a RIP module to form raster image data for each page, the RIP module processing the PDL image data and storing the raster image data in the RIP orientation.

In another aspect, an apparatus for processing a print job in a printing platform is provided. In one embodiment, the apparatus includes: a parser module for analyzing printer description language (PDL) image data for a print job; a controller module in operative communication with the parser module for determining a raster image processor (RIP) orientation for the print job based at least in part on the analysis of the PDL image data, the RIP orientation being selected from a landscape orientation and a portrait orientation; a storage device; and a RIP module in operative communication with the controller module and the storage device for processing the PDL image data for each page of the print job in the RIP orientation to form raster image data for each page and storing the raster image data in the storage device in the RIP orientation.

BRIEF DESCRIPTION OF THE DRAWINGS

FIG. 1 is a chart comparing C2C time measurements for exemplary embodiments of a laser-based and SIJ-based printing platforms;

FIG. 6 is a chart comparing RIP and C2C time measurements for a landscape PCL print job for exemplary embodiments of existing laser-based and SIJ-based printing platforms with LEF process orientation;

FIG. 7 is a chart comparing RIP and C2C time measurements for a landscape PCL print job for exemplary embodiments of existing laser-based and SIJ-based printing platforms with SEF process orientation;

FIG. 8 is a chart comparing RIP and C2C time measurements for a landscape PS print job for exemplary embodiments of existing laser-based and SIJ-based printing platforms with LEF process orientation;

FIG. 9 is a chart comparing RIP and C2C time measurements for a landscape PS print job for exemplary embodiments of existing laser-based and SIJ-based printing platforms with SEF process orientation;

DETAILED DESCRIPTION

Figure 2:
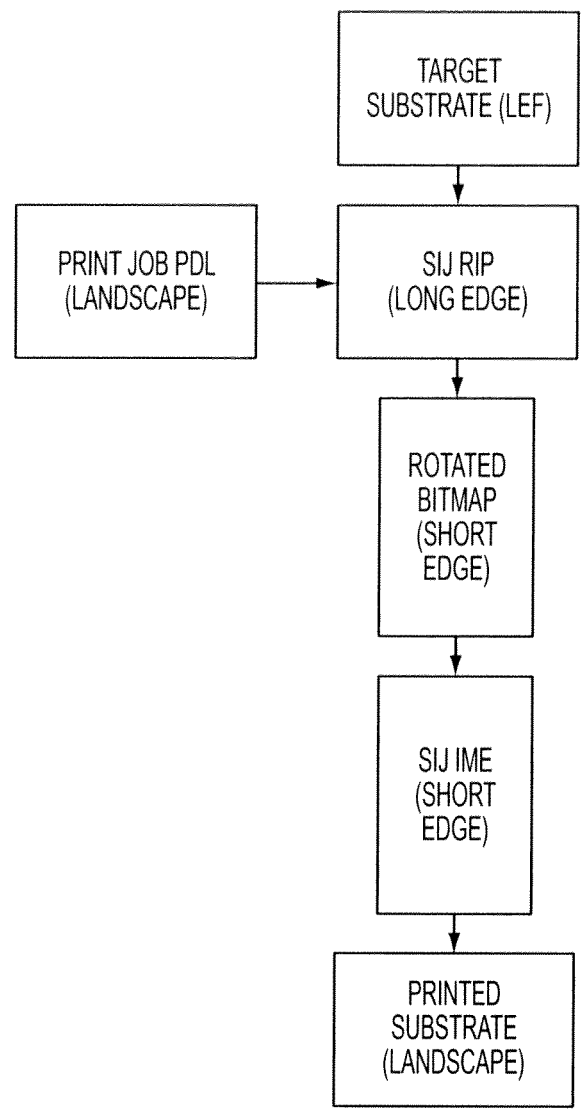
FIG. 2 is a functional diagram showing an exemplary embodiment of a process for processing a print job in an SIJ-based printing platform in which target substrate is fed in an long edge feed (LEF) fashion.

This disclosure describes various embodiments of methods and apparatus for processing a print job in a printing platform in which PDL image data may be parsed to determine a desired orientation for RIP, raster image data from the RIP may be rotated from the RIP orientation to a transverse orientation for printing corresponding page content on target substrate pages by the print engine. Various embodiments disclosed herein provide improved performance in the printing platform for the corresponding print job by reducing RIP time when the preferred orientation of image data for RIP is different from the preferred orientation of image data for the print engine. These improvements in print performance may be more noticeable for certain types of print jobs, such as print jobs with complex content (e.g., graphics objects, image objects, or any combination thereof). This allows print performance to be driven by the inherent performance of the printing technology and the design configuration selected for the printing platform. For example, this simplifies cost tradeoff considerations between laser-based and SIJ-based printing platforms for customers.

The concept for rotation of image data orientation between RIP and print engine processes can be applied to all types of printing platforms, including multi-color printing platforms, to enhance printing performance where it is preferred to perform such processes in transverse orientations. Parsing the PDL image data allows selection of the RIP orientation to be adaptive to PDL commands embedded in the print job for individual pages, object content of individual pages, and PDL commands or object content for each color separation. In other words, the RIP orientation can be dynamically adjusted during the print job for individual pages and for each color separation as PDL commands and object content are analyzed for the corresponding page.

The preferred orientation for image data at the IOT in laser-based printing platforms is the "cross-process" direction because the laser moves across the target substrate pages in the "cross-process" direction. Thus, when target substrate pages are fed through the printing platform in long edge feed (LEF) or landscape orientation, the preferred orientation for image data at the IOT is long edge (i.e., landscape) orientation. Similarly, when target substrate pages are fed in short edge feed (SEF) or portrait orientation, the preferred orientation for image data at the IOT is short edge (i.e., portrait) orientation.

The preferred orientation for image data at the IME in SIJ-based printing platforms is the "process" direction because the ink jets in the print head for the IME are arranged in one or more columns aligned with the "process" direction. The print head for the IME moves across an intermediate transfer device (e.g., a drum or belt) in the "cross-process" direction printing a strip of the page in segments of scan lines. If the SIJ-based printing platform does not use an intermediate transfer device, the IME moves across target substrate pages in the "cross-process" direction, printing strips of pages in the same manner. While the strip is in the "cross-process" direction, the scan lines and the segments of the scan lines printed by the ink jets are in the "process" direction. Thus, when target substrate pages are fed through the printing platform in LEF (i.e., landscape) orientation, the preferred orientation for image data at the IME is short edge (i.e., portrait) orientation. Similarly, when target substrate pages are fed in SEF (i.e., portrait) orientation, the preferred orientation for image data at the IME is long edge (i.e., landscape) orientation.

Based on the foregoing, printing performance on print jobs with complex content (e.g., graphics objects, image objects, or any combination thereof), such as PPT files, that are printed in landscape orientation on target substrate pages fed through the printing platform in a long edge (i.e., landscape) orientation can be significantly improved in SIJ-based printing platforms by using a long edge (i.e., landscape) orientation for RIP, rotating the image data output from the RIP to form a rotated bitmap in a short edge (i.e., portrait) orientation compatible with the IME, and using the rotated image data at the IME to print the corresponding target substrate page. FIG. 2 provides a flow chart for this scenario and shows the orientation of image data as the print job is being processed by the SIJ-based printing platform.

Figure 3:
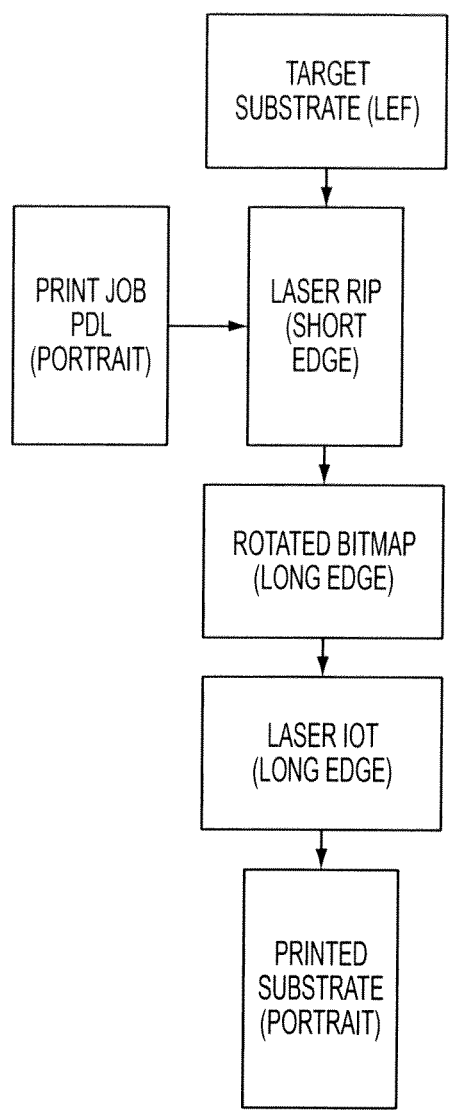
FIG. 3 is a functional diagram showing an exemplary embodiment of a process for processing a print job in a laser-based printing platform in which target substrate is fed in an LEF fashion.

Similarly, printing performance on such print jobs that are printed in portrait orientation on target substrate pages fed through the printing platform in a long edge (i.e., landscape) orientation can be significantly improved in laser-based printing platforms by using a short edge (i.e., portrait) orientation for RIP, rotating the image data output from the RIP to form a rotated bitmap in a long edge (i.e., landscape) orientation compatible with the IOT, and using the rotated image data at the IOT to print the corresponding target substrate page. FIG. 3 provides a flow chart for this scenario and shows the orientation of image data as the print job is being processed by the laser-based printing platform.

Figure 4:
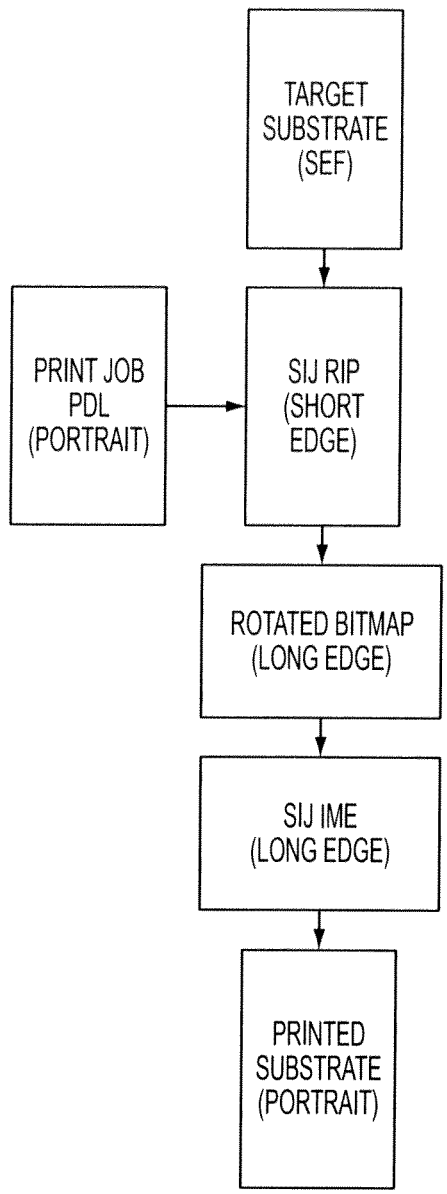
FIG. 4 is a functional diagram showing an exemplary embodiment of a process for processing a print job in an SIJ-based printing platform in which target substrate is fed in an short edge feed (SEF) fashion.

Likewise, printing performance on such print jobs that are printed in portrait orientation on target substrate pages fed through the printing platform in a short edge (i.e., portrait) orientation can be significantly improved in SIJ-based printing platforms by using a short edge (i.e., portrait) orientation for RIP, rotating the image data output from the RIP to form a rotated bitmap in a long edge (i.e., landscape) orientation compatible with the IME, and using the rotated image data at the IME to print the corresponding target substrate page. FIG. 4 provides a flow chart for this scenario and shows the orientation of image data as the print job is being processed by the SIJ-based printing platform.

Figure 5:
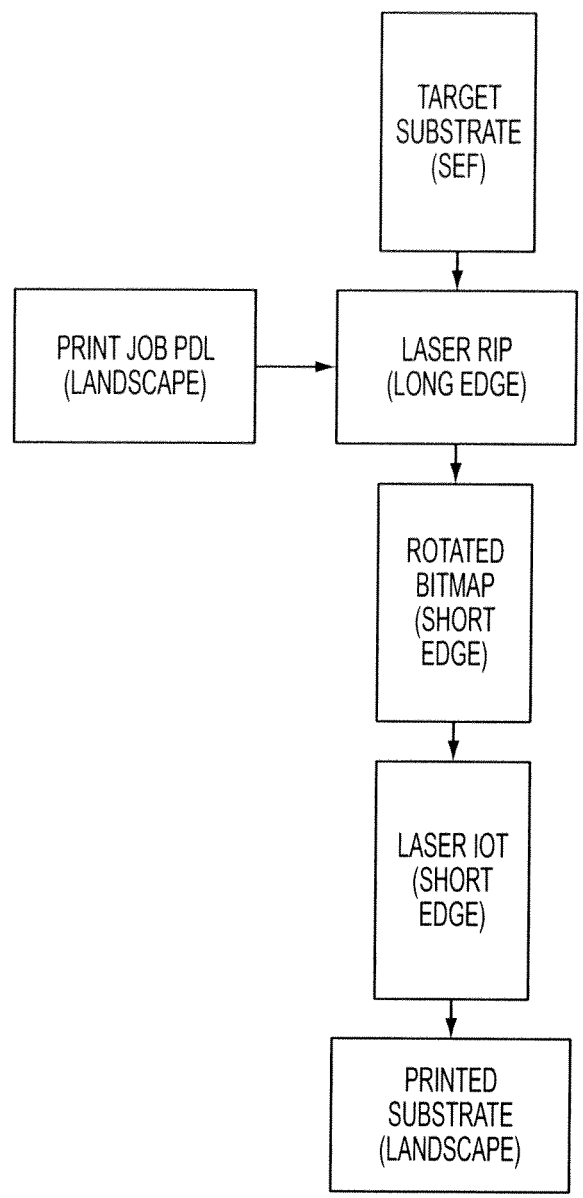
FIG. 5 is a functional diagram showing an exemplary embodiment of a process for processing a print job in a laser-based printing platform in which target substrate is fed in an SEF fashion.

Similarly, printing performance on such print jobs that are printed in landscape orientation on target substrate pages fed through the printing platform in a short edge (i.e., portrait) orientation can be significantly improved in laser-based printing platforms by using a long edge (i.e., landscape) orientation for RIP, rotating the image data output from the RIP to form a rotated bitmap in a short edge (i.e., portrait) orientation compatible with the IOT, and using the rotated image data at the IOT to print the corresponding target substrate page. FIG. 5 provides a flow chart for this scenario and shows the orientation of image data as the print job is being processed by the laser-based printing platform.

With reference to FIGS. 6-9, the Xerox task force came up with a reduced test condition that shows how print performance can be improved on SIJ-based printing platform. The charts in FIGS. 6-9 compare the RIP time between an exemplary existing laser-based printing platform and an exemplary existing SIJ-based printing platform. Both printing platforms use SBC controllers with the same CPU, processor/memory speed, and HW architecture. Paper was loaded on the machines in SEF orientation (see FIGS. 7 and 9) and LEF orientation (see FIGS. 6 and 8) for collection of the time measurements reflected in FIGS. 6-9. In the current design of the printing platforms, the paper output orientation (i.e., printing orientation) defines the RIP orientation used by the controller. In other words, print jobs with LEF paper output will cause the controller to RIP along the LEF orientation for the laser-based printing platform and along the SEF orientation for the SIJ-based printing platform. Similarly, print jobs with SEF paper output causes the controller to RIP along the SEF orientation for the laser-based printing platform and along the LEF orientation for the SIJ-based printing platform. Thus, the most pertinent comparison of the data is comparing RIP for the laser-based printing platform in LEF to RIP for the SIJ-based printing platform in SEF and vice versa.

As shown in FIGS. 6-9, RIP time measurements, for some documents, are highly dependent on the orientation. For the PCL printing case, both types of printing platforms RIP to 600×600×1 bit. One can see that there is a strong correlation between the laser-based LEF measurements and SIJ-based SEF measurements and vice versa for PCL printing. PS printing also shows this strong correlation, although there are larger differences that may be due to noise or to the differences in laser-based RIP to 600×600×1 bit and SIJ-based RIP to 567×450×4 bit. However, it is quite clear that the behavior of these printing platforms is comparable along these lines.

Figure 10:
FIG. 10 is an exemplary landscape page for printing with an exemplary image object.

With reference to FIG. 10, consider printing a landscape image, such as the exemplary photo image. Since a RIP operation renders text, graphic, and image objects (i.e., elements) within a page of a print job to a raster image bitmap, the RIP time for each page is dependent on the content of the corresponding page as well as the selected orientation for printing. In order to understand the differences in RIP time for differences in RIP orientation, consider where the same document page is selected for printing in a landscape orientation and RIPed to both a "landscape" frame buffer and a "portrait" frame buffer. The light lines in FIG. 10 show the scan lines in the original (source) image that are selected for printing in the landscape orientation and provided to the RIP.

Figure 11:
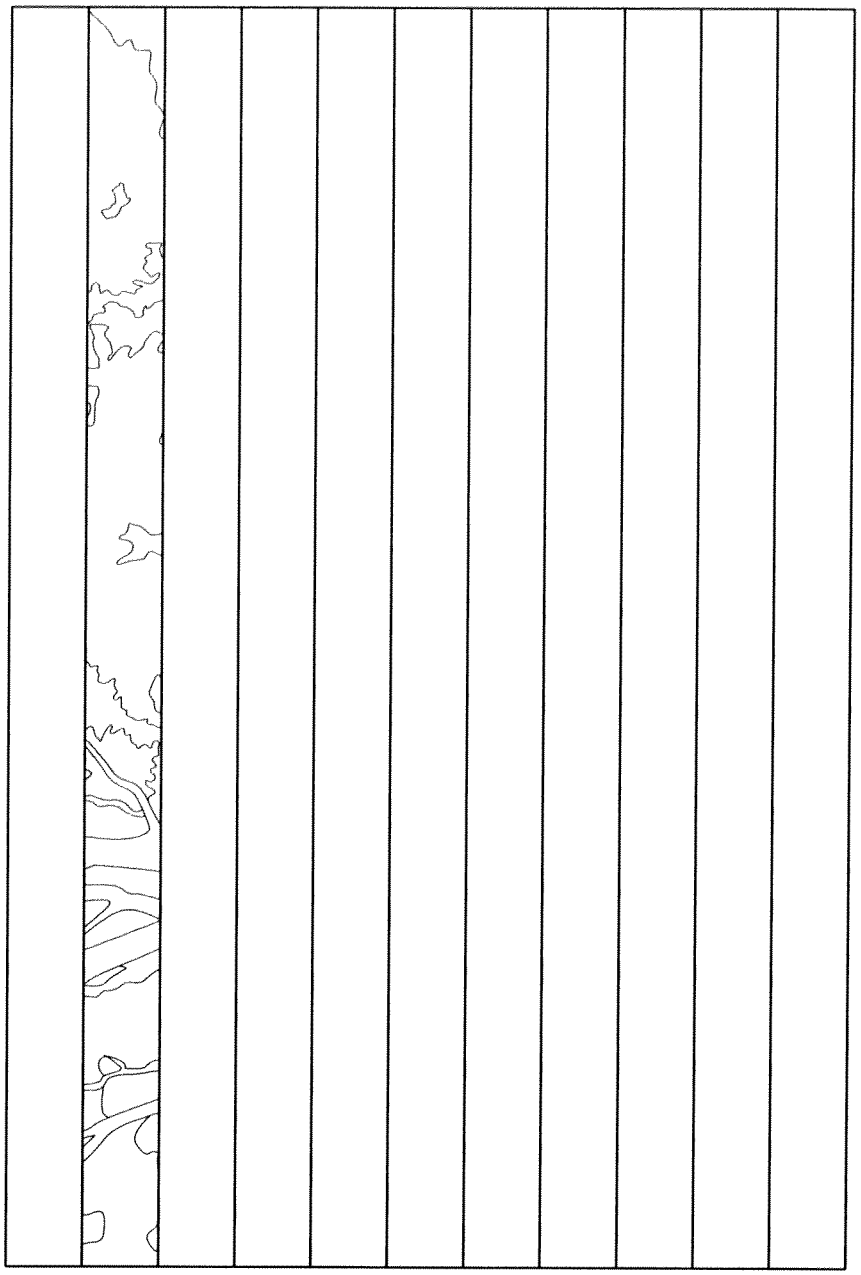
FIG. 11 is an exemplary landscape output frame buffer showing an exemplary landscape slice of the exemplary landscape page from FIG. 10.

With reference to FIG. 11, when a page selected for printing in a landscape orientation is RIPed to a "landscape" output frame buffer, "landscape" slices of the image in the "landscape" output frame buffer relate to "landscape" slices of the original (source) image. RIPing image data for a page selected for printing in a landscape orientation to a "landscape" output frame buffer is faster because the scan lines of the source image provided to RIP correspond to the scan lines of the output frame buffer created by the RIP. The dark lines in FIG. 11 show the scan lines of the "landscape" output frame buffer. There may not be a 1:1 correlation between pixels in the original (source) image and the bitmap pixels in the "landscape" output frame buffer if the RIP performs scaling.

Figure 12:
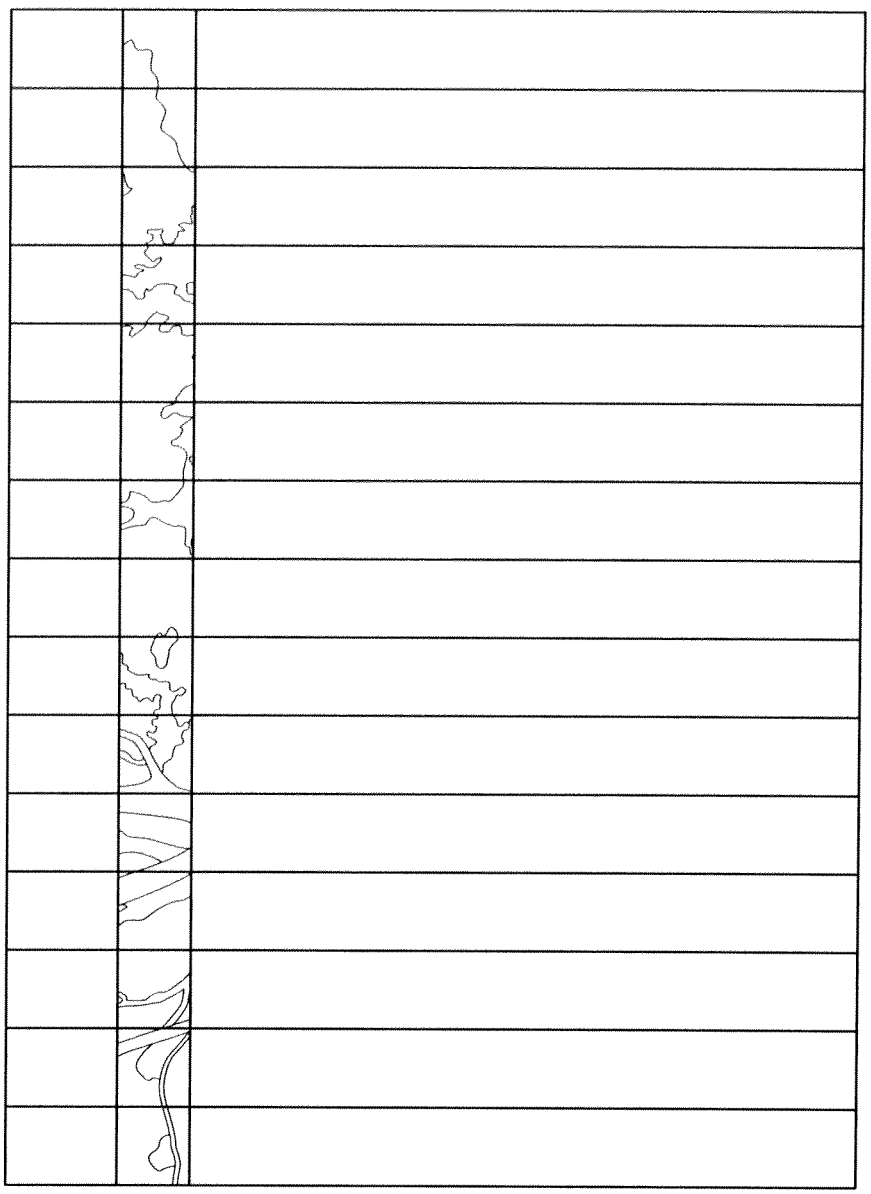
FIG. 12 is an exemplary portrait output frame buffer showing an exemplary landscape slice of the exemplary landscape page from FIG. 10.

With reference to FIG. 12, when a page selected for printing in a landscape orientation is RIPed to a "portrait" output frame buffer, "landscape" slices of the image in the "portrait" output frame buffer include portions of each scan line in the "portrait" output frame buffer. RIPing image data for a page selected for printing in a landscape orientation to a "portrait" output frame buffer is slower because the scan lines of the source image provided to RIP are transverse to the scan lines of the output frame buffer created by the RIP. Manipulating individual pixels from all of the input scan lines, rather than all of the pixels for one input scan line slows the rendering down. The dark lines in FIG. 12 show the direction of the scan lines of the "portrait" output frame buffer. Again, there may not be a 1:1 correlation between pixels in the original (source) image and the bitmap pixels in the "portrait" output frame buffer if the RIP performs scaling.

The full impact on RIP performance is dependent on content of pages in the print job that are selected for printing in an orientation transverse from the RIP orientation. For example, RIP performance gets worse when many narrow "landscape" strips of images in a "landscape" original (source) image have to be processed and placed in transverse scan lines of a "portrait" output frame buffer. The extreme case is when the entire "portrait" page is made up of page-wide narrow single pixel strips that make up the "landscape" page images. Due to the overlapping requirement of objects on a page, these single pixel strips can appear on top of each other increasing the total number of these offending page images.

For example, printing a PowerPoint file creates PS or PCL files that may include thousands of single pixel strips for certain page images in the print job. This may create some worst case scenarios for the problem disclosed herein. However, this is by no means a unique case since this occurs when simply printing a relatively common set of PowerPoint slides on a SIJ-based printing platform that is most efficient in feeding target substrate pages in an LEF orientation and expects data to be sent to it in an SEF orientation. The same issue can occur if the same file is printed on a laser-based printing platform that feeds target substrate pages in an SEF orientation and uses an IOT that prints the target substrate pages in the SEF orientation.

In general terms, the various embodiments of methods and apparatus disclosed herein add a rotator to the processing for a print job between the RIP and print engine to effectively rotate the orientation of the raster image bitmap resulting from RIP to be compatible with the orientation required by the print engine. This effectively decouples the RIP from the print engine. Under these circumstances, the controller is free to select a RIP orientation for processing the print job that reduces RIP time. For example, a default RIP orientation may be established by the manufacturer of the printing platform or may be a user-selectable parameter in the printing platform. Nevertheless, the preferred RIP orientation can be selected dynamically during the processing of the print job because the PDL image data for the print job can be analyzed independently for each page of the print job. The raster image bitmaps resulting from the RIP are stored in memory in the selected RIP orientation. The rotator reads the raster image bitmaps from the memory in a preferred orientation for the print engine. The rotator can read the stored raster image bitmaps in scan lines that are transverse from the orientation of the scan lines from which the raster image bitmaps were stored. Typically, the orientation of scan lines provided by the rotator is the "portrait" (i.e., SEF) orientation for SIJ-based printing platforms and the "landscape" (i.e., LEF) orientation for laser-based printing platforms. The rotator is actually capable of providing any suitable rotation (or no rotation) to the raster image bitmap because it simply randomly accesses the memory to read image data to form scan lines in an orientation that is compatible with the print engine. This enables the printing platform to perform RIP in an orientation optimized for the print job and printing in an orientation optimized for the print engine based on the target substrate orientation through the printing platform. For example, the selected orientation for the print job may be selected by a user in a print parameter dialog box after the document is selected for printing from an application program. The printing platform may also be able to perform RIP in different orientations for different pages of the print job such that the orientation is optimized for individual pages of the print job. For example, pages 1 through 10 may be in landscape orientation, page 11 may be in portrait orientation, and subsequent pages may be in landscape orientation.

The rotator may be implemented using an application specific integrated circuit (ASIC). As such, the rotator may be referred to as a hardware (HW) rotator. The rotator may also be implemented using any suitable combination of hardware and software. The rotator frees the RIP to render images in a preferred orientation, particularly for the most difficult documents expected to be encountered. The preferred orientation for RIP would typically be based on the selected orientation for printing the page from the application program and may be different from the orientation required by the print engine.

Figure 13:
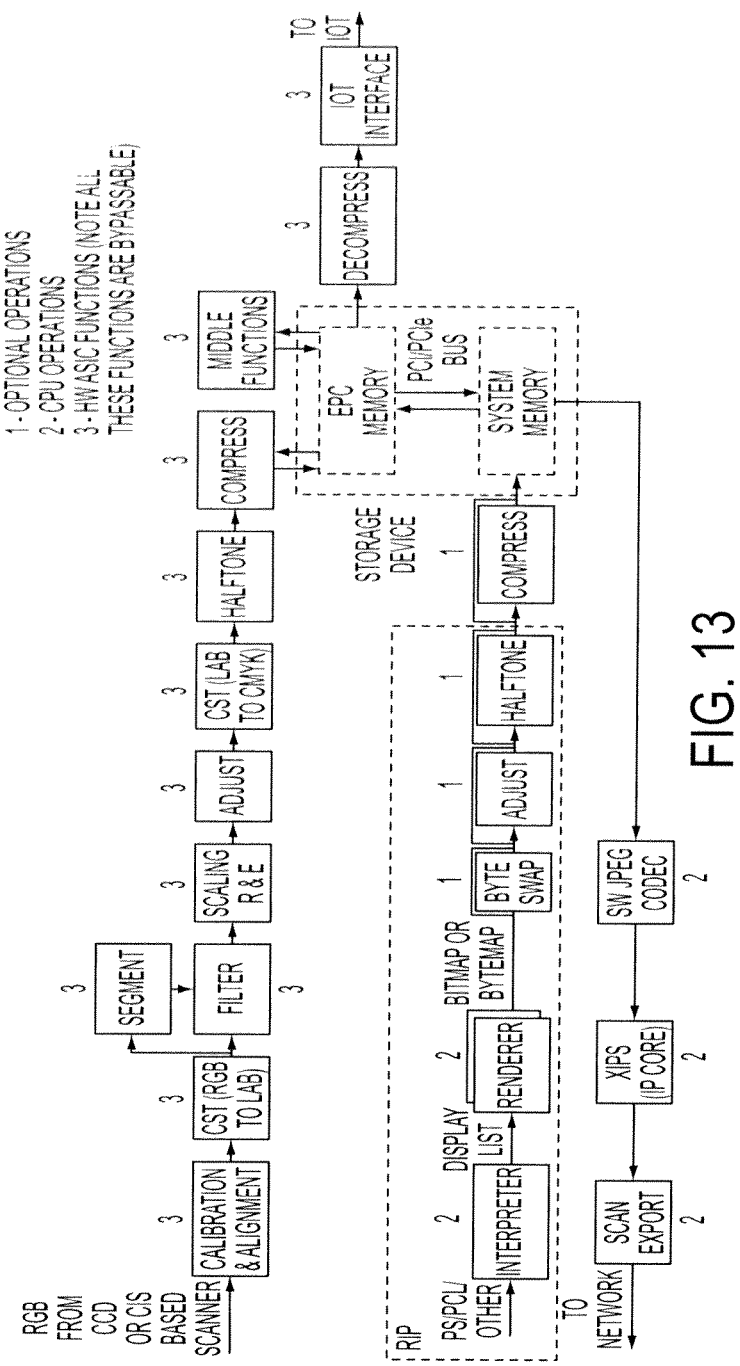
FIG. 13 is a block diagram of an exemplary embodiment of a multi-function platform with copying, scanning, and printing operations.

With reference to FIG. 13, an exemplary embodiment of a multi-function platform, such as a multi-function device (MFD), shows image paths for printing, copying, and scanning operations in relation to operations performed by a central processing unit (CPU), functions performed by an ASIC, optional operations that may be performed by the CPU, and a storage device. The CPU operations include an interpreter module, a renderer module, a SW JPEG codec module, an XIPS (IPCore) module, and a scan export module. The ASIC functions include a calibration alignment module, a first CST (RGB to Lab) module, a segment module, a filter module, a scaling R & E module, a first adjust module, a second CST (Lab to CMYK) module, a first halftone module, a first compress module, a middle functions module, a decompress module, and an IOT interface module. The optional operations include a byte swap module, a second adjust module, a second halftone module, and a second compress module. The storage device includes a system memory and an electronic pre-collation (EPC) memory. It is understood that the storage device may include any suitable arrangement of suitable storage devices.

The interpreter module and renderer module form a RIP. The byte swap module, second adjust module, and second halftone module are optional operations that may be included in the RIP in any suitable combination.

The middle functions module may include a rotator function (i.e., HW rotator). Previously, a rotator function has been used in conjunction with copying and scanning operations. However, the image paths for copying, scanning, and printing operations in the MFD shown in FIG. 13 each possess the capability to do HW rotation of images. The rotator function has not previously been used in conjunction with printing operations. The performance of the HW rotator for copying and scanning operations has steadily been improving with each generation of ASIC chip sets for MFDs and copiers. The HW rotator can run at close to or exceeding print engine speed.

The amount of uniquely reserved contiguous memory needed for the image rotation operation has also been decreasing. There is no need for dedicated memory for image rotation. EPC memory, system memory, or any suitable bulk image memory can be allocated for rotation buffering.

As shown in the generic block diagram of the MFD image paths, the "middle functions" block includes rotation, annotation and other image manipulation functions that are typically use to post-process images that were captured from the scanner. These functions are typically used to support copy and scan features. The middle functions are built in to the ASIC to provide near real-time image processing functions.

Figure 14:
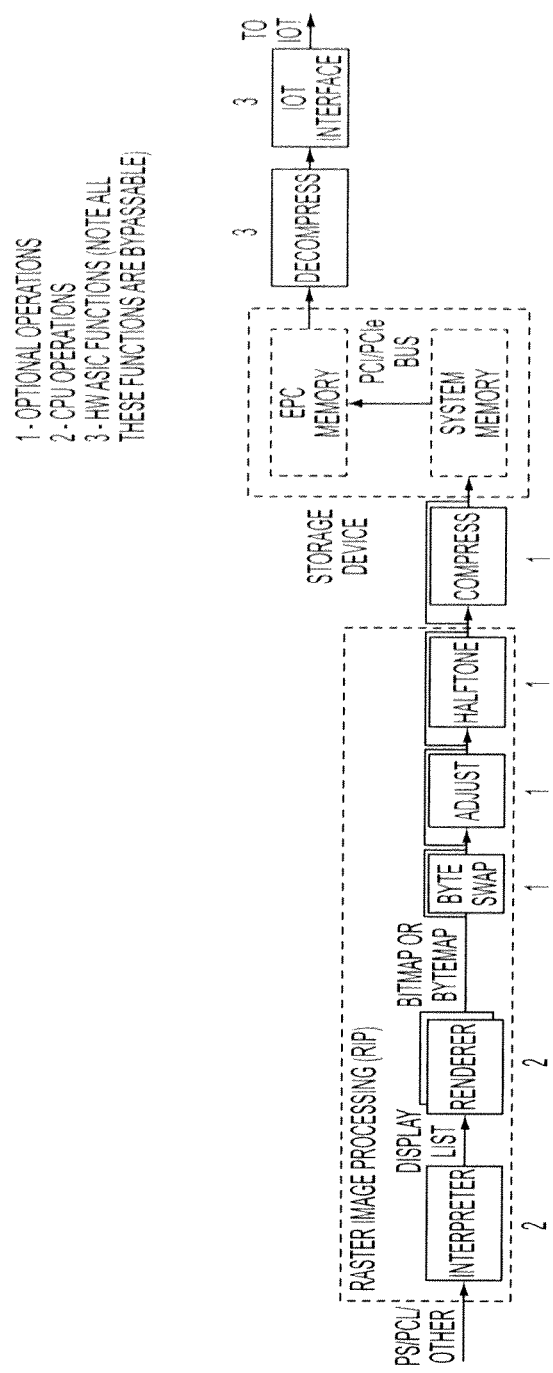
FIG. 14 is a block diagram of an exemplary embodiment of a printing platform for processing a print job.

With reference to FIG. 14, an exemplary embodiment of an existing printing platform shows a RIP in a traditional print path. As shown, the RIP includes an interpreter module and a renderer module. The RIP may also include a byte swap module, an adjust module, and a halftone module in any suitable combination. The RIP outputs image data that forms an output frame buffer in system memory. The image data from the RIP may be compressed before being stored in system memory. This output frame buffer is moved from system memory to EPC memory. From EPC memory, the output frame buffer may be decompressed and transferred to the print engine (e.g., IOT or IME). As mentioned above, the RIP rendering direction (i.e., orientation) is directly tied to the direction (i.e., orientation) that image data is needed by the print engine. Notably, no ASIC middle functions from FIG. 13 are shown in the existing printing platform of FIG. 14. In particular, the existing printing platform of FIG. 14 does not include a HW rotator and does not use any type of rotator function on the image data in the print path between the RIP and the print engine.

Figure 15:
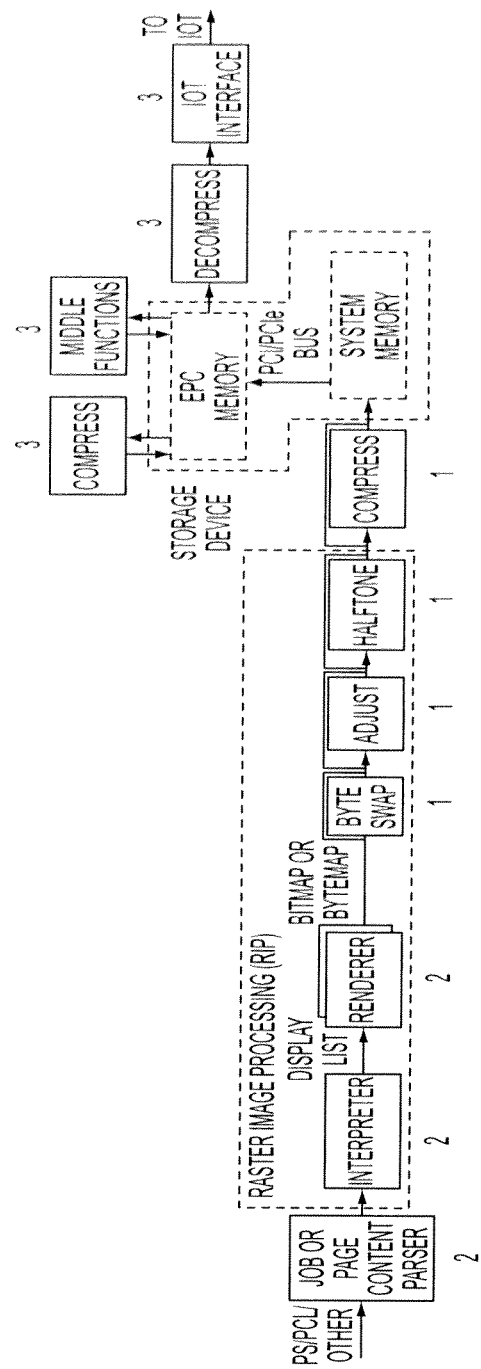
FIG. 15 is a block diagram of another exemplary embodiment of a printing platform for processing a print job.

With reference to FIG. 15, an exemplary embodiment of a printing platform that implements a job or page content parser at the front end of the RIP via CPU operations and a HW rotator between the RIP and the print engine via ASIC functions that include middle functions with the rotator function. The addition of the content parser in the print path distinguishes this printing platform from the printing platform of FIG. 14. The addition of the HW rotator in the print path also distinguishes this printing platform from the printing platform of FIG. 14. Use of the content parser permits a controller for the printing platform to determine a print job or an individual page of the print job should be rotated for optimum RIP performance. Use of the rotator function permits the orientation of image data for the RIP to be different from the orientation of image data for the print engine. Thus, the orientation of image data for the RIP can be based on the orientation selected for the print job by the user via the corresponding application program from which the print job is initiated without regard to the required orientation of image data for the print engine.

The RIP outputs image data that forms an output frame buffer in system memory. The image data from the RIP may be compressed before being stored in system memory. The output frame buffer is read from system memory, rotated by the rotator function, and stored in the EPC memory in the orientation of image data for the print engine. If necessary, the rotator function decompresses and re-compresses the output frame buffer. Moreover, if the output frame buffer is already in the orientation of image data for the print engine, the rotator function may be bypassed or may merely pass along the output frame buffer without performing the rotation. From EPC memory, the output frame buffer may be decompressed and transferred to the print engine (e.g., IOT or IME).

By making use of the rotator in the middle functions block, the output frame buffer from the RIP is decompressed and rotated before being recompressed and moved to the EPC memory. The newly rotated and compressed output frame buffer can then be decompressed and transferred to the print engine (e.g., IOT or IME). Alternatively, the output frame from the RIP can be left uncompressed so that the middle functions do not need to decompress the image before rotation.

Figure 16A:
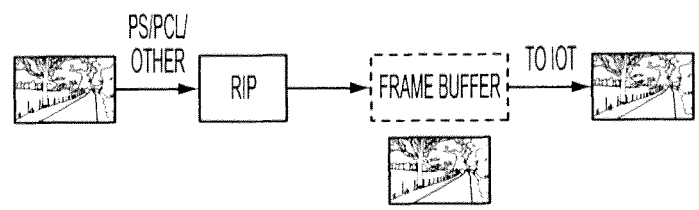
FIG. 16 is a functional diagram showing an exemplary embodiment of print functions in laser-based and SIJ-based printing platforms.
Figure 16B:
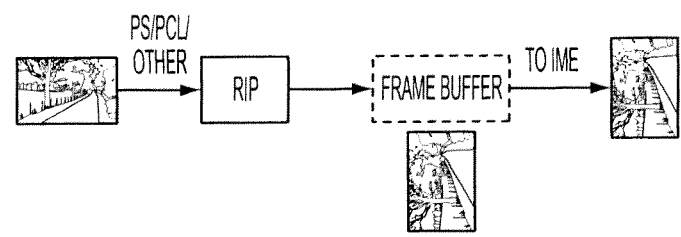

With reference to FIG. 16, a schematic representation of an exemplary embodiment of current print functions in laser-based (FIG. 16A) and SIJ-based (FIG. 16B) printing platforms shows that the print functions are currently performed differently by the different printing platforms in printing the same landscape page. In both printing platforms, the RIP orientation is tied to the orientation that image data is needed for the print engine (i.e., IOT or IME). The resulting RIP performance is constrained by this link to the print engine requirement for image data to be provided at a particular orientation regardless of whether the page to be printed is a landscape or portrait page.

Figure 17:
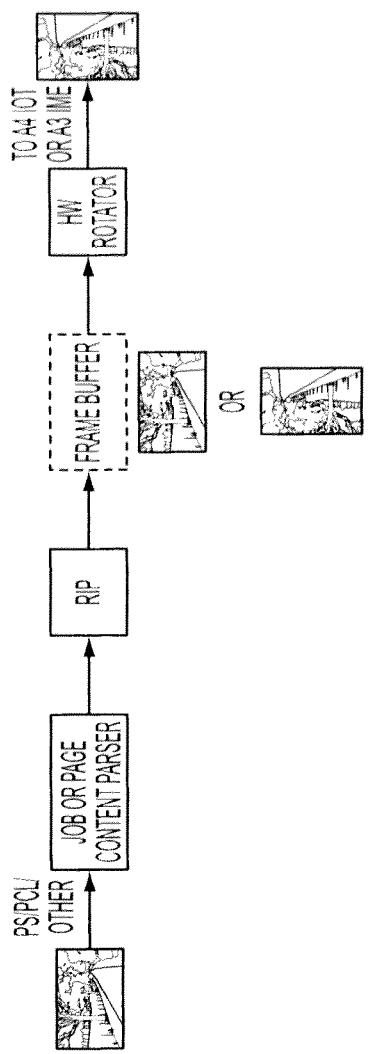
FIG. 17 is a functional diagram showing another exe p embodiment of print functions in laser-based and SIJ-based printing platforms.

With reference to FIG. 17, a schematic representation of an exemplary embodiment of print functions in laser-based and SIJ-based printing platforms shows how the RIP and print engine functions are decoupled. This allows the RIP orientation to be different from the orientation of image data required by the print engine. Under these circumstances, the RIP orientation can be based on different criteria, such as the orientation of the page to be printed. Thus, RIP performance and print engine performance can be optimized on different criteria. A content parser at the front of the RIP allows the printing platform to determine the optimum RIP orientation for each print job, each page of the print job, and each separation of the print job in various combinations depending on the sophistication of the analysis of the PDL image data and controller algorithms for determining the optimum RIP orientation. The controller coordinates the adaptive RIP orientation with rotation of the RIP output, as needed, to match the orientation of bitmap image data from RIP to the orientation required by the print engine. This enables overall performance of the printing platform to be optimized without RIP performance being unnecessarily constrained by the requirements of the print engine. This also allows print path system designers to implement a preferred RIP orientation.

The PDL image data parsing can be done on a print job basis, page-to-page basis, or color separation basis in any suitable combination. Certain PDLs do not provide commands for individual pages. In such cases, the RIP orientation can be set for the overall print job. However, another approach would be to parse the object content of individual pages in the print job and dynamically set the RIP orientation in response to different object content on different pages. There are many possible ways to determine preferred RIP orientation. For example, the content parser could parse for occurrences of specific PDL strings that represent a difficult to RIP image. Alternatively, the content parser could detect the orientation of pages from commands embedded in the document or the orientation selected as a print parameter when the document was selected for printing.

In another embodiment, the content parser could parse for content objects (e.g., graphs objects or image objects) in the job or individual pages or for image scan line orientation. For example, the content parser could detect all content objects to determine a majority rule policy, detect some fixed number of content objects and apply a majority rule policy, or detect first content objects and use these as an indication of content for the whole job or the page.

The above techniques for content parsing are not comprehensive. Parsing techniques can be expanded and/or refined by designers, who are familiar with the art, for each of the PDLs being parsed. This includes current and future PDLs compatible with the printing platform.

In summary, this disclosure provides an alternate way to RIP documents for printing in a printing platform by using a content parser at the front end of the RIP and by using a rotation function between the RIP and the print engine. Use of the content parser enables the controller for the printing platform to adaptively pick a preferred RIP orientation for optimum print performance for individual print jobs or individual pages within a print job as well as individual color separations for the print job or the individual page. Use of the rotation function allows a system designer to select a preferred RIP orientation for optimum print performance without being bound by the print engine to which image data from the RIP is sent.

Figure 18:
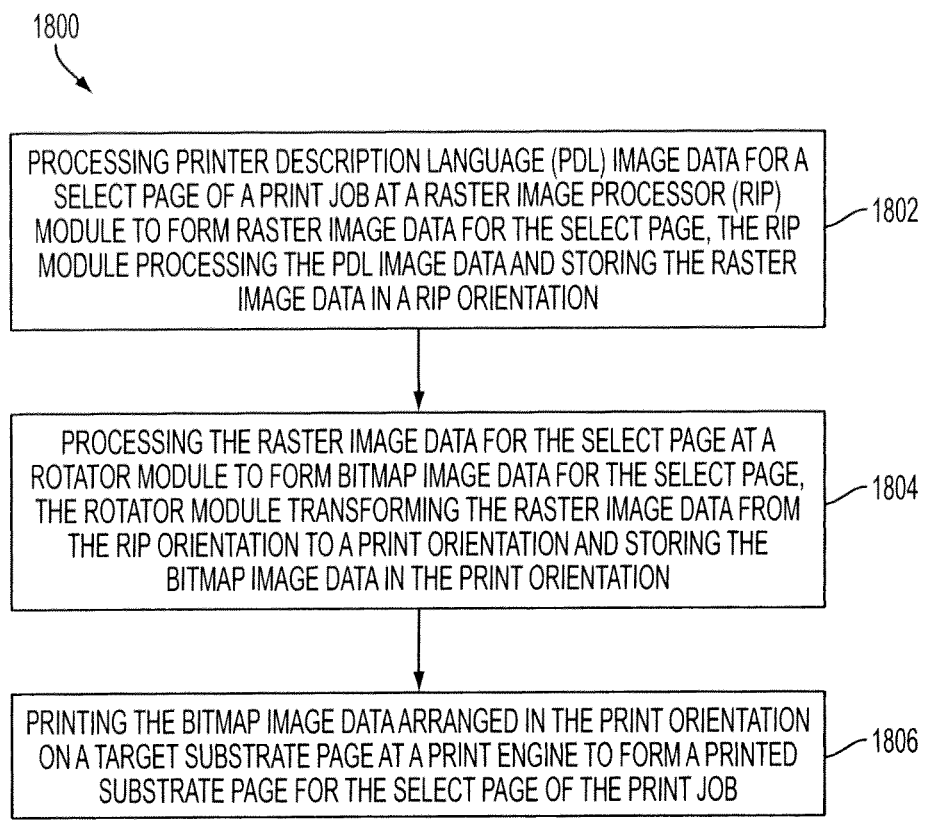
FIG. 18 is a flowchart showing an exemplary embodiment of a process for processing a print job in a printing platform.

With reference to FIG. 18, an exemplary embodiment of a process 1800 for processing a print job in a printing platform begins at 1802 where PDL image data for a select page of a print job is processed at a RIP module to form raster image data for the select page. The RIP module processes the PDL image data and stores the raster image data in a RIP orientation. At 1804, the raster image data for the select page is processed at a rotator module to form bitmap image data for the select page. The rotator module transforms the raster image data from the RIP orientation to a print orientation and stores the bitmap image data in the print orientation. Next, the bitmap image data arranged in the print orientation is printed on a target substrate page at a print engine to form a printed substrate page for the select page of the print job.

In another embodiment of the process 1800, the PDL image data includes PCL image data. In yet another embodiment, the PDL image data includes PS image data. In other embodiments, the PDL image data includes another type of suitable PDL image data.

In still another embodiment of the process 1800, the print orientation is transverse in relation to the RIP orientation. In a further embodiment to the embodiment being described, the print orientation may be based on a short edge dimension of the target substrate page and the RIP orientation is landscape. In this embodiment, the target substrate page is fed through the printing platform in an LEF fashion and the printing platform is SIJ-based. Alternatively, in this embodiment, the target substrate page is fed through the printing platform in an SEF fashion and the printing platform is laser-based. In another further embodiment to the embodiment being described, the print orientation may be based on a long edge dimension of the target substrate page and the RIP orientation is portrait. In this embodiment, the target substrate page is fed through the printing platform in an SEF fashion and the printing platform is SIJ-based. Alternatively, in this embodiment, the target substrate page is fed through the printing platform in an LEF fashion and the printing platform is laser-based.

In still yet another embodiment of the process 1800, the print orientation is the same orientation as the RIP orientation. In a further embodiment to the embodiment being described, the print orientation may be based on a long edge dimension of the target substrate page and the RIP orientation is landscape. In another further embodiment to the embodiment being described, the print orientation may be based on a short edge dimension of the target substrate page and the RIP orientation is portrait.

Figure 19:
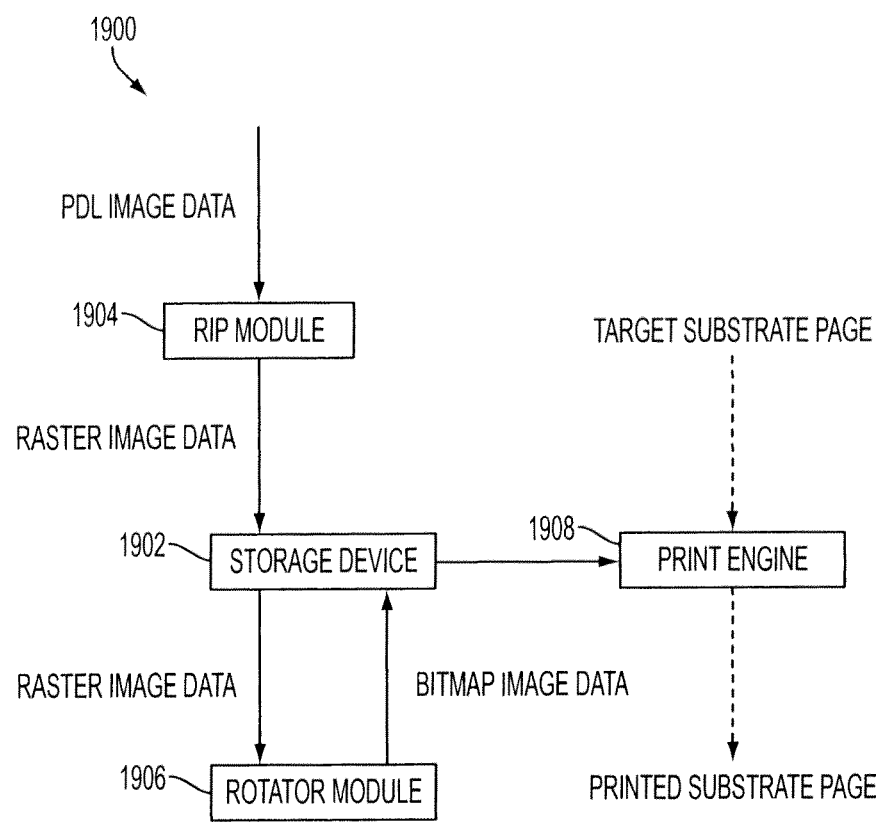
FIG. 19 is a block diagram of yet another exemplary embodiment of a printing platform for processing a print job.

With reference to FIG. 19, an exemplary embodiment of a printing platform 1900 for processing a print job includes a storage device 1902, a RIP module 1904, a rotator module 1906, and a print engine 1908. The RIP module 1904 is in operative communication with the storage device 1902 for processing PDL image data for a select page of a print job in a RIP orientation to form raster image data for the select page. The RIP module 1904 stores the raster image data in the storage device 1902 in the RIP orientation. The rotator module 1906 is in operative communication with the storage device 1902 for processing the raster image data for the select page to form bitmap image data for the select page by transforming the raster image data from the RIP orientation to a print orientation. The rotator module 1906 stores the bitmap image data in the storage device 1902 in the print orientation. The print engine 1908 is in operative communication with the storage device 1902 for printing the bitmap image data arranged in the print orientation on a target substrate page to form a printed substrate page for the select page of the print job.

In another embodiment of the printing platform 1900, the print orientation is transverse in relation to the RIP orientation. In a further embodiment to the embodiment being described, the print orientation may be based on a short edge dimension of the target substrate page and the RIP orientation is landscape. In this embodiment, the target substrate page is fed through the printing platform in an LEF fashion, the printing platform is SIJ-based, and the print engine 1908 includes an IME. Alternatively, in this embodiment, the target substrate page is fed through the printing platform in an SEF fashion, the printing platform is laser-based, and the print engine 1908 includes an IOT. In another further embodiment to the embodiment being described, the print orientation may be based on a long edge dimension of the target substrate page and the RIP orientation is portrait. In this embodiment, the target substrate page is fed through the printing platform in an SEF fashion, the printing platform is SIJ-based, and the print engine 1908 includes an IME. Alternatively, in this embodiment, the target substrate page is fed through the printing platform in an LEF fashion, the printing platform is laser-based, and the print engine 1908 includes an IOT.

In yet another embodiment of the printing platform 1900, the print orientation is the same orientation as the RIP orientation. In a further embodiment to the embodiment being described, the print orientation may be based on a long edge dimension of the target substrate page and the RIP orientation is landscape. In another further embodiment to the embodiment being described, the print orientation may be based on a short edge dimension of h target substrate page and the RIP orientation is portrait.

Figure 20:
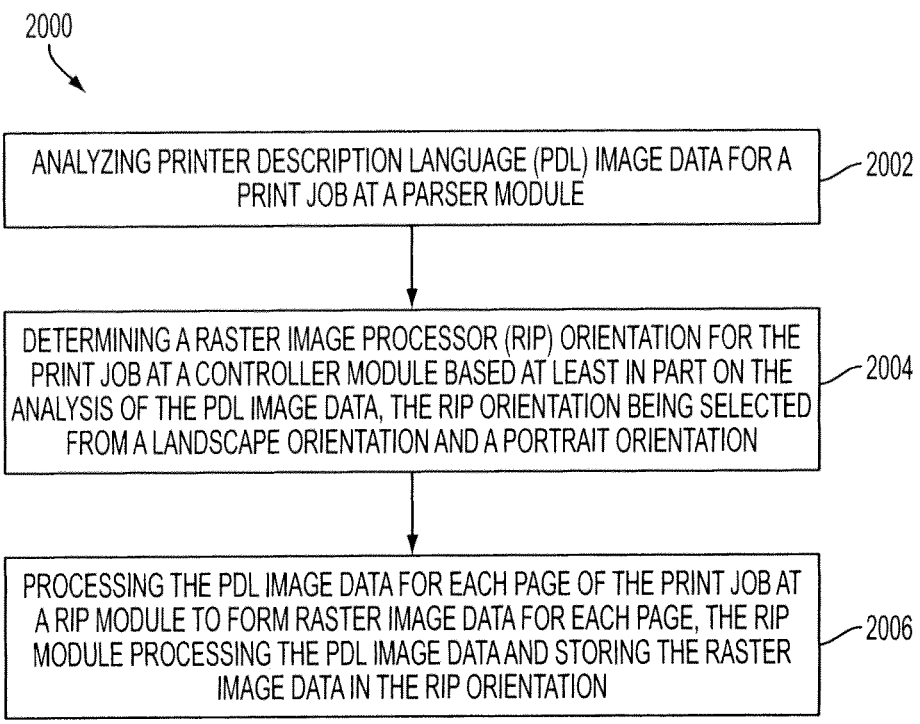
FIG. 20 is a flowchart showing another exemplary embodiment of a process for processing a print job in a printing platform.

With reference to FIG. 20, an exemplary embodiment of a process 2000 for processing a print job in a printing platform begins at 2002 where PDL image data for a print job is analyzed at a parser module. At 2004, a RIP orientation for the print job is determined at a controller module based at least in part on the analysis of the PDL image data. The RIP orientation being selected from a landscape orientation and a portrait orientation. Next, the PDL image data for each page of the print job is processed at a RIP module to form raster image data for each page. The RIP module processing the PDL image data and storing the raster image data in the RIP orientation.

In another embodiment of the process 2000, the RIP orientation remains the same for each page of the print job. In yet another embodiment of the process 2000, the landscape orientation or the portrait orientation is selected as the RIP orientation for the print job to reduce RIP time for the print job. In still another embodiment of the process 2000, the landscape orientation or the portrait orientation is selected as the RIP orientation for the print job based at least in part on a page layout parameter for the print job in the PDL image data.

In still yet another embodiment of the process 2000, the landscape orientation or the portrait orientation is selected as the RIP orientation for the print job based at least in part on a print orientation required by a print engine for the print job when selection is indeterminate from the PDL image data.

In another embodiment of the process 2000, the RIP orientation for the print job is changed from the landscape orientation to the portrait orientation or vice versa for a select page of the print job based at least in part on the PDL image data for the select page. In this embodiment, the landscape orientation or the portrait orientation is selected as the RIP orientation for the select page based at least in part on object orientations for content of the select page in the PDL image data for the select page. In a further embodiment to the embodiment being described, the landscape orientation or the portrait orientation is selected as the RIP orientation for the select page based at least in part on object orientations for one or more image objects within the content of the select page in the PDL image data for the select page. In another further embodiment to the embodiment being described, the landscape orientation or the portrait orientation is selected as the RIP orientation for the select page based at least in part on object orientations for one or more graphics objects within the content of the select page in the PDL image data for the select page.

In yet another embodiment of the process 2000, the PDL image data for each page of the print job is analyzed at the parser module. Next, the RIP orientation for the print job is changed from the landscape orientation to the portrait orientation or vice versa for at least one page of the print job based at least in part on the PDL image data for the corresponding page to reduce RIP time for the print job. In a further embodiment to the embodiment being described, the landscape orientation or the portrait orientation is selected as the RIP orientation for each page of the print job based at least in part on object orientations for content of the select page in the PDL image data for the corresponding page.

In still another embodiment of the process 2000, the raster image data for each page of the print job is processed at a rotator module to form bitmap image data for each page of the print job. The rotator module transforming the corresponding raster image data from the RIP orientation to a print orientation and storing the corresponding bitmap image data in the print orientation. Next, the bitmap image data arranged in the print orientation is printed for each page of the print job on corresponding target substrate pages at a print engine to form corresponding printed substrate pages for the print job. In a further embodiment to the embodiment being described, the print orientation is transverse in relation to the RIP orientation for at least one page of the print job. In another further embodiment to the embodiment being described, the process determines the print orientation is the same as the RIP orientation at the controller module for at least one page of the print job, bypasses the processing by the rotator module for each corresponding at least one page, and the print engine prints the raster image data arranged in the RIP orientation for each corresponding at least one page.

In still yet another embodiment of the process 2000, the printing platform is a multi-color printing platform and 2002 through 2006 are performed for at least one color separation of the printing platform. In another embodiment of the process 2000, the printing platform is a multi-color printing platform and 2002 through 2006 are performed for each color separation of the printing platform. In a further embodiment of the embodiment being described, the RIP orientation selected for each color separation is the same for each page of the print job. In another further embodiment of the embodiment being described, the landscape orientation is selected as the RIP orientation for a select page of the print job in a first color separation and the portrait orientation is selected as the RIP orientation for the select page in a second color separation to reduce the RIP time for the print job.

Figure 21:
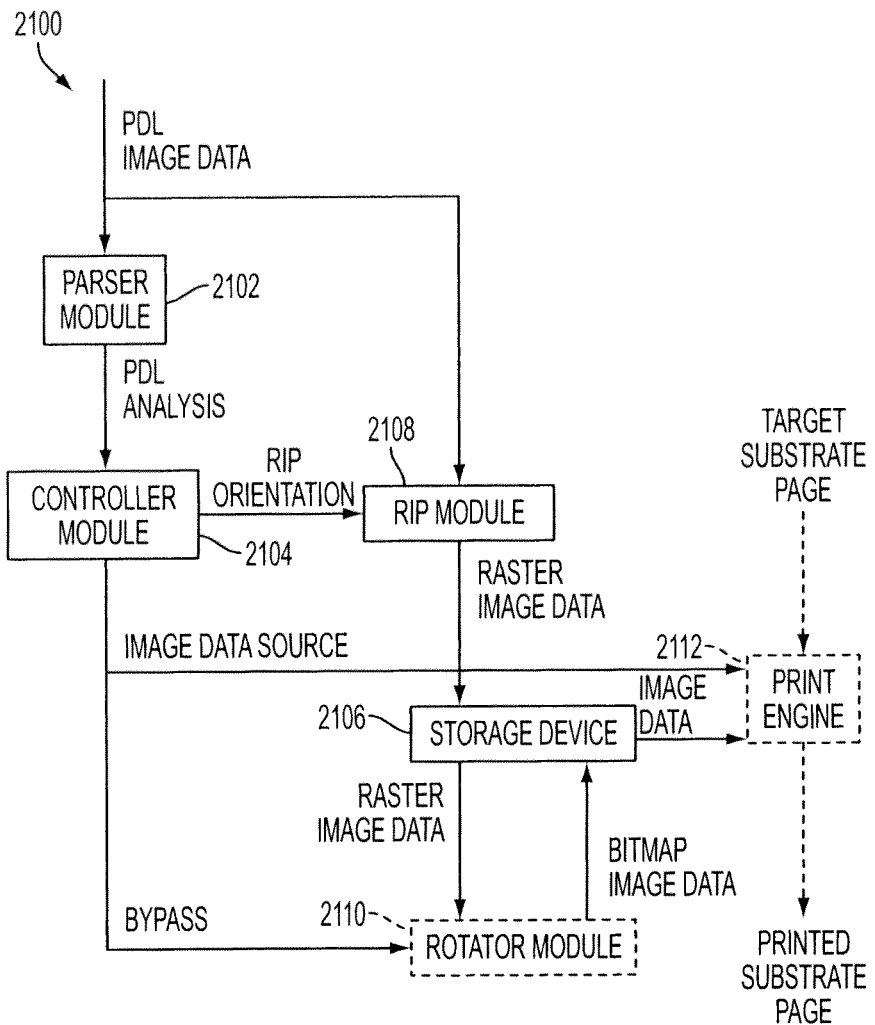
FIG. 21 is a block diagram of still another exemplary embodiment of a printing platform for processing a print job.

With reference to FIG. 21, an exemplary embodiment of a printing platform 2100 for processing a print job includes a parser module 2102, a controller module 2104, a storage device 2106, and a RIP module 2108. The parser module 2102 for analyzing PDL image data for a print job. The controller module 2104 is in operative communication with the parser module 2102 for determining a RIP orientation for the print job based at least in part on the analysis of the PDL image data. The RIP orientation being selected from a landscape orientation and a portrait orientation. The RIP module 2108 is in operative communication with the controller module 2104 and the storage device 2106 for processing the PDL image data for each page of the print job in the RIP orientation to form raster image data for each page. The RIP module 2108 stores the raster image data in the storage device in the RIP orientation.

In another embodiment of the printing platform 2100, the controller module 2104 selects the landscape orientation or the portrait orientation as the RIP orientation for the print job to reduce RIP time for the print job. In yet another embodiment of the printing platform 2100, the controller module 2104 selects the landscape orientation or the portrait orientation as the RIP orientation for the print job based at least in part on a page layout parameter for the print job in the PDL image data. In still another embodiment of the printing platform 2100, the controller module 2104 selects the landscape orientation or the portrait orientation as the RIP orientation for the print job based at least in part on a print orientation required by a print engine for the print job when selection is indeterminate from the PDL image data.

In still yet another embodiment of the printing platform 2100, the controller module 2104 changes the RIP orientation for the print job from the landscape orientation to the portrait orientation or vice versa for a select page of the print job based at least in part on the PDL image data for the select page. In this embodiment, the controller module 2104 selects the landscape orientation or the portrait orientation as the RIP orientation for the select page based at least in part on object orientations for content of the select page in the PDL image data for the select page. In a further embodiment of the embodiment being described, the controller module 2104 selects the landscape orientation or the portrait orientation as the RIP orientation for the select page based at least in part on object orientations for one or more image objects within the content of the select page in the PDL image data for the select page. In another further embodiment of the embodiment being described, the controller module 2104 selects the landscape orientation or the portrait orientation as the RIP orientation for the select page based at least in part on object orientations for one or more graphics objects within the content of the select page in the PDL image data for the select page.

In another embodiment of the printing platform 2100, the parser module 2102 analyzes the PDL image data for each page of the print job. In this embodiment, the controller module 2104 changes the RIP orientation for the print job from the landscape orientation to the portrait orientation or vice versa for at least one page of the print job based at least in part on the PDL image data for the corresponding page to reduce RIP time for the print job. In a further embodiment of the embodiment being described, the controller module 2104 selects the landscape orientation or the portrait orientation as the RIP orientation for each page of the print job based at least in part on object orientations for content of the select page in the PDL image data for the corresponding page.

In yet another embodiment, the printing platform 2100 also includes a rotator module 2110 and a print engine 2112. The rotator module 2110 is in operative communication with the controller module 2104 and the storage device 2106 for processing the raster image data for each page of the print job to form bitmap image data for each page by transforming the corresponding raster image data from the RIP orientation to a print orientation. The rotator module 2110 stores the corresponding bitmap image data in the storage device 2106 in the print orientation. The print engine 2112 is in operative communication with the controller module 2104 and the storage device 2106 for printing the bitmap image data arranged in the print orientation for each page of the print job on corresponding target substrate pages to form corresponding printed substrate pages for the print job. In a further embodiment of the embodiment being described, the controller module 2104 determines the print orientation is the same as the RIP orientation for at least one page of the print job, bypasses the processing by the rotator module 2110 for each corresponding at least one page, and controls the print engine 2112 such that the raster image data arranged in the RIP orientation is used for printing each corresponding at least one page.

In still another embodiment of the printing platform 2100, the printing platform is a multi-color printing platform and the parser module 2102 analyzes PDL image data for the print job in at least one color separation of the multi-color printing platform. The controller module 2104 determines a RIP orientation for each at least one color separation for the print job, the RIP module processes the PDL image data for each at least one color separation for the print job in the RIP orientation. The RIP module 2108 stores the raster image data for each at least one color separation for the print job in the storage device 2106 in the RIP orientation.

In still yet another embodiment of the printing platform 2100, the printing platform is a multi-color printing platform and the parser module 2102 analyzes PDL image data for the print job in each color separation of the multi-color printing platform. The controller module 2104 determines a RIP orientation for each color separation for the print job. The RIP module 2108 processes the PDL image data for each color separation for the print job in the RIP orientation. The RIP module 2108 stores the raster image data for each color separation for the print job in the storage device 2106 in the RIP orientation. In a further embodiment of the embodiment being described, the RIP orientation selected by the controller module 2104 for each color separation is the same for each page of the print job. In another further embodiment of the embodiment being described, the controller module 2104 selects the landscape orientation as the RIP orientation for a select page of the print job in a first color separation and selects the portrait orientation as the RIP orientation for the select page in a second color separation to reduce the RIP time for the print job.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for processing a print job in a printing platform, comprising:
    a) analyzing printer description language (PDL) image data for a print job at a parser module;
    b) determining a raster image processor (RIP) orientation for each page of the print job at a controller module based at least in part on the analysis of the PDL image data, the RIP orientation being selected from a landscape orientation and a portrait orientation; and
    c) processing the PDL image data for each page of the print job in the determined RIP orientation at a RIP module to form raster image data for each page and storing the raster image data for each corresponding page of the print job in the determined RIP orientation;
    wherein the determined RIP orientation for each page of the print job varies between the landscape orientation and the portrait orientation based at least in part on the PDL image data for content of the corresponding page to reduce RIP time for the print job.

2. The method set forth in claim 1, further comprising:
    d) selecting the landscape orientation or the portrait orientation as the RIP orientation for each page of the print job based at least in part on a page layout parameter for the print job or the corresponding page in the PDL image data.

3. The method set forth in claim 1, further comprising:
    d) selecting the landscape orientation or the portrait orientation as the RIP orientation for at least one page of the print job based at least in part on a print orientation required by a print engine for the print job when selection between the landscape orientation and the portrait orientation for the corresponding page is indeterminate from the PDL image data.

4. The method set forth in claim 1, further comprising:
    e) selecting the landscape orientation or the portrait orientation as the RIP orientation for at least one page of the print job based at least in part on the PDL image data associated with object orientations for content of the corresponding page.

5. The method set forth in claim 1, further comprising:
    d) processing the raster image data for each page of the print job at a rotator module to form bitmap image data for each page of the print job, the rotator module transforming the corresponding raster image data from the RIP orientation to a print orientation and storing the corresponding bitmap image data in the print orientation; and
    e) printing the bitmap image data arranged in the print orientation for each page of the print job on corresponding target substrate pages at a print engine to form corresponding printed substrate pages for the print job.

6. The method set forth in claim 1, wherein the printing platform is a multi-color printing platform, the method further comprising:
    d) performing a) through c) for each color separation of the printing platform.

7. The method set forth in claim 5 wherein the print orientation is transverse in relation to the RIP orientation for at least one page of the print job.

8. The method set forth in claim 5, further comprising:
    f) determining the print orientation is the same as the RIP orientation at the controller module for at least one page of the print job and bypassing the processing in d) for each corresponding at least one page, wherein the printing in e) is performed such that the raster image data arranged in the RIP orientation is printed for each corresponding at least one page.

9. The method set forth in claim 6 wherein, for each page of the print job, the RIP orientation selected for each color separation represented in the corresponding page is the same.

10. An apparatus for processing a print job in a printing platform, comprising:
a parser module for analyzing printer description language (PDL) image data for a print job;
a controller module in operative communication with the parser module for determining a raster image processor (RIP) orientation for each page of the print job based at least in part on the analysis of the PDL image data, the RIP orientation being selected from a landscape orientation and a portrait orientation;
a storage device; and
a RIP module in operative communication with the controller module and the storage device for processing the PDL image data for each page of the print job in the RIP orientation to form raster image data for each page and storing the raster image data in the storage device in the determined RIP orientation;
wherein the controller module is configured to vary the determined RIP orientation for each page of the print job between the landscape orientation and the portrait orientation based at least in part on the PDL image data for content of the corresponding page to reduce RIP time for the print job.

11. The apparatus set forth in claim 10, further comprising:
a rotator module in operative communication with the controller module and the storage device for processing the raster image data for each page of the print job to form bitmap image data for each page by transforming the corresponding raster image data from the RIP orientation to a print orientation and storing the corresponding bitmap image data in the storage device in the print orientation; and
a print engine in operative communication with the controller module and the storage device for printing the bitmap image data arranged in the print orientation for each page of the print job on corresponding target substrate pages to form corresponding printed substrate pages for the print job.

12. The apparatus set forth in claim 10 wherein the printing platform is a multi-color printing platform and the parser module analyzes PDL image data for the print job in at least one color separation of the multi-color printing platform, the controller module determines a RIP orientation for each at least one color separation for the print job, the RIP module processes the PDL image data for each at least one color separation for the print job in the RIP orientation, and the RIP module stores the raster image data for each at least one color separation for the print job in the storage device in the RIP orientation.

13. The apparatus set forth in claim 10 wherein the controller module is configured to select the landscape orientation or the portrait orientation as the RIP orientation for at least one page of the print job based at least in part on the PDL image data associated with object orientations for content of the corresponding page.

14. The apparatus set forth in claim 11 wherein the controller module determines the print orientation is the same as the RIP orientation for at least one page of the print job, bypasses the processing by the rotator module for each corresponding at least one page, and controls the print engine such that the raster image data arranged in the RIP orientation is used for printing each corresponding at least one page.

15. The apparatus set forth in claim 11 wherein the print orientation is transverse in relation to the RIP orientation for at least one page of the print job.

16. A method for processing a print job in a printing platform, comprising:
a) analyzing printer description language (PDL) image data for each page of a print job at a parser module;
b) determining a raster image processor (RIP) orientation for each page of the print job at a controller module based at least in part on the analysis of the PDL image data, the RIP orientation being selected from a landscape orientation and a portrait orientation;
c) varying the determined RIP orientation for each page of the print job between the landscape orientation and the portrait orientation based at least in part on the PDL image data for content of the corresponding page to reduce RIP time for the print job; and
d) processing the PDL image data for each page of the print job in the determined RIP orientation at a RIP module to form raster image data for each page and storing the raster image data for each corresponding page of the print job in the determined RIP orientation.

17. The method set forth in claim 16, further comprising:
e) selecting the landscape orientation or the portrait orientation as the RIP orientation for at least one page of the print job based at least in part on the PDL data associated with object orientations for content of the corresponding page.

18. The method set forth in claim 16, further comprising:
e) processing the raster image data for each page of the print job at a rotator module to form bitmap image data for each page of the print job, the rotator module transforming the corresponding raster image data from the RIP orientation to a print orientation and storing the corresponding bitmap image data in the print orientation; and
f) printing the bitmap image data arranged in the print orientation for each page of the print job on corresponding target substrate pages at a print engine to form corresponding printed substrate pages for the print job.

19. The method set forth in claim 18 wherein the print orientation is transverse in relation to the RIP orientation for at least one page of the print job.

20. The method set forth in claim 18, further comprising:
g) determining the print orientation is the same as the RIP orientation at the controller module for at least one page of the print job and bypassing the processing in e) for each corresponding at least one page, wherein the printing in f) is performed such that the raster image data arranged in the RIP orientation is printed for each corresponding at least one page.

* * * * *